(No Model.) 2 Sheets—Sheet 2.
A. A. FOIRET.
MAGAZINE CAMERA.
No. 524,802. Patented Aug. 21, 1894.
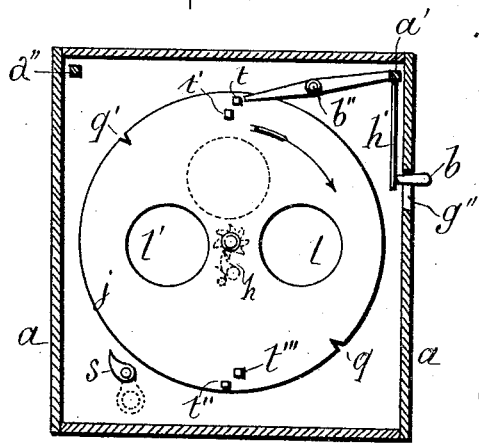
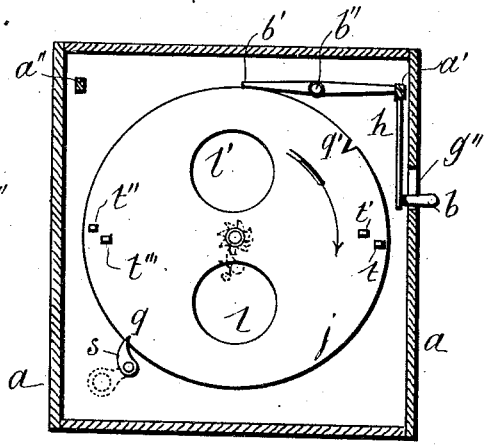
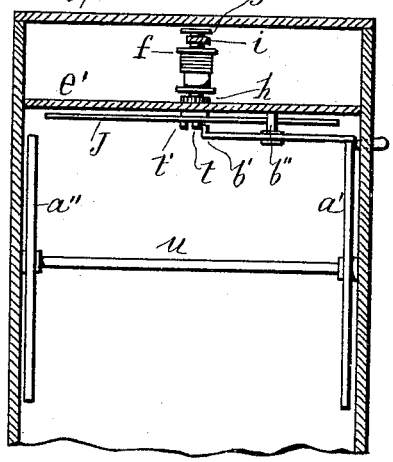
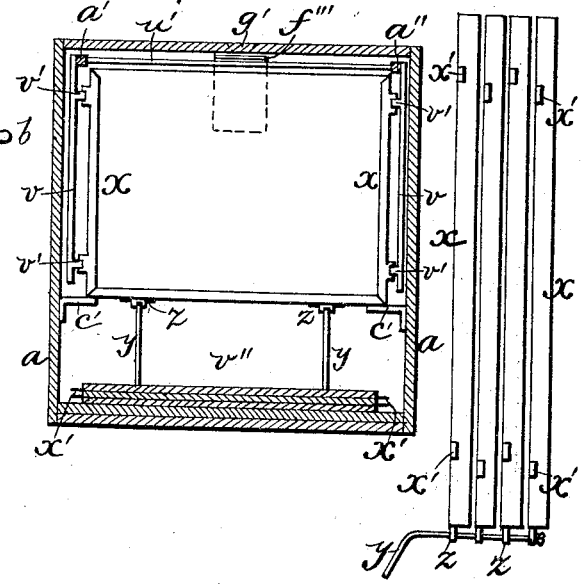

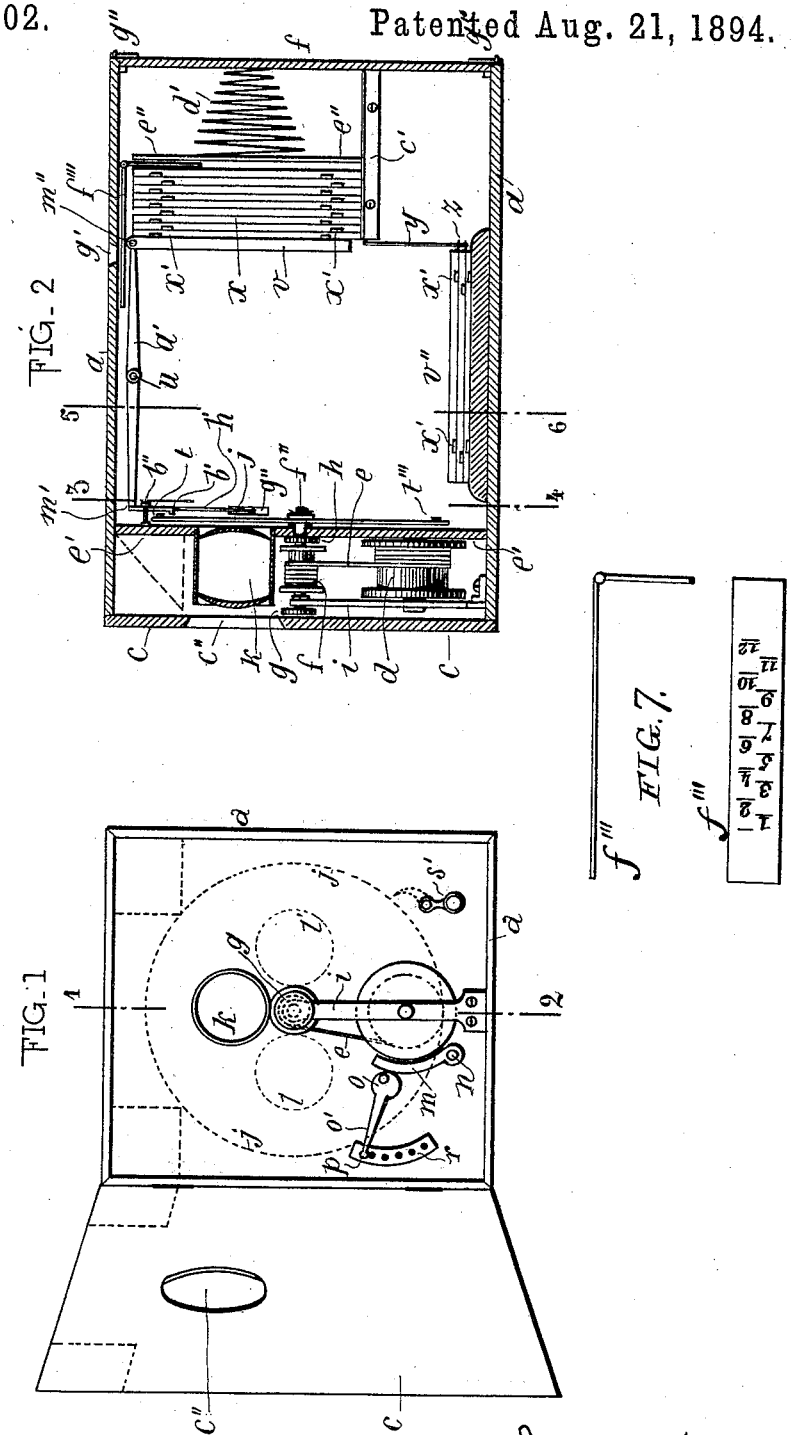

UNITED STATES PATENT OFFICE.

ALPHONSE ALEXANDRE FOIRET, OF NICE, FRANCE.

MAGAZINE-CAMERA.

SPECIFICATION forming part of Letters Patent No. 524,802, dated August 21, 1894.

Application filed October 5, 1893. Serial No. 487,274. (No model.) Patented in France May 20, 1893, No. 230,158.

*To all whom it may concern:*

Be it known that I, ALPHONSE ALEXANDRE FOIRET, a citizen of France, residing at Nice, in the Republic of France, have invented certain new and useful Improvements in Magazine-Cameras; and I do hereby declare the following to be a full, clear, and exact description of the invention, such as will enable others skilled in the art to which it appertains to make and use the same.

This invention relates to photographic cameras which are operated by a push-button and has for its chief object to provide simple and satisfactory means for changing the plate holders by the same motion which opens the shutter.

To this end the said invention consists in the construction and combination of devices hereinafter particularly set forth and claimed.

In the accompanying drawings, Figure 1 represents a front view of the apparatus, the door being open. Fig. 2 represents a view partly in section, following the line 1—2 of Fig. 1, showing the interior arrangement of the apparatus. Fig. 3 represents a cross section on the lines 3—4 of Fig. 2 showing the shutter in its position of displacement. Fig. 4 represents a section on the line 5—6 of Fig. 2, showing the contrivance by means of which the changing of plates or films is automatically effected. Fig. 5 represents a transverse section similar to Fig. 3, showing the parts in a different position. Fig. 6 represents a side elevation of the plate carriers or supports. Fig. 7 represents a side elevation and plan of the indicator of the number of plates contained in the apparatus; and Fig. 8 represents a horizontal section of a part of the apparatus taken just below the top of the casing, the parts being in the position shown in Fig. 3.

This apparatus is composed of a rectangular camera box $a$ containing all the mechanism and having only the button $b$ extending to the outside. The camera box $a$ is divided internally into two parts by a fixed partition $e'$ supporting the tube of the objective $k$ and the shafts of the shutter $j$ and spring drum $d$. At the front, that is to say, at the side of the objective this box $a$ is closed by a hinged door $c$ and having an opening $c''$ registering with the objective $k$. The side opposite to the door $c$ is closed by a movable back $f'$ which is held in a fixed position by hooks $g''$, permitting the introduction of plates into the apparatus. Between the door $c$ and the partition $e'$ the mechanism is located which puts in motion a disk $j$ serving as shutter to the objective $k$. This mechanism is composed of a drum $d$ having a spring within it like that of an ordinary alarm clock. On the periphery of this spring drum is fastened a cord $e$ capable of being wound thereon; the other end of this cord being fixed on a shaft $f$ provided with a button $g$. On this shaft is also fixed a ratchet wheel having a pawl $h$. The shaft $f$, as well as that of the spring-drum $d$, is journaled in the same support $i$. On the prolongation $f''$ of the shaft $f$ traversing the partition $e'$ a disk $j$ is mounted, provided with two circular openings $l$ $l'$ (Figs. 3 and 5) arranged diametrically opposite each other which in the rotation of the disk $j$ come alternately into position behind the objective $k$ to uncover it.

The spring-drum is made ready again for working by turning the shaft $f$ by means of the button $g$. The cord $e$ rolled on the exterior $d$ of the drum unrolls itself and is wound on the shaft $f$, thereby rotating the spring-drum and putting the spring under strain. At the end of this operation, the shutter is in position and ready for the operation of the apparatus.

In order to regulate the speed of rotation of the spring-drum $d$ at will as required, a friction brake is used consisting of a brake-shoe $m$, pivoting on a shaft $n$. This shoe $m$ receives pressure by means of an eccentric $o$ provided with an arm or needle $o'$ having its point $p$ bent back for engaging successively in the holes $r$. To regulate the speed of the barrel $d$ and consequently of the shutter $j$, the arm $o'$ is depressed more or less so that the eccentric $o$ presses the shoe $m$ against the periphery of the spring-drum, producing a certain pressure on it which diminishes the speed of motion of the shutter.

To put this apparatus in operative position, it suffices to arrest the movement of the shutter. For this purpose the latter is provided with two notches $q$ $q'$ diametrically opposite each other. In these notches a pawl $s$ engages. The operation of the apparatus is as follows: The door $c$, Fig. 1, is opened, and by means of the button $s'$ the operator raises the pawl $s$ until the point of it comes in contact with the disk $j$, Fig. 5. He then depresses the button $b$ to disengage the shutter. The latter turns until its notch $q$ engages the point of pawl $s$ which stops the said disk. In this position the opening $l'$ of the disk is exactly behind the objective $k$. The apparatus is then ready for a prolonged exposure. The inner face of the shutter $j$ is provided with two pairs of stops $t\,t'$ and $t''\,t'''$ diametrically opposite to each other and so arranged that the stop $t$ is a little farther outward and farther forward than the stop $t'$, and the stop $t''$ is similarly farther outward and farther forward than the stop $t'''$. These stops come in contact with the receiving end of a lever $b'$, Figs. 2, 3 and 8, pivoted on a shaft $b''$ fixed on the partition $e'$. The lever $b'$ is operated from the outside by a button $b$ sliding in an opening $g''$ provided in the side wall of the case. The button $b$ is connected with the lever $b'$ by a rod $h'$. In raising this button again lightly, the lever $b'$ is rocked, its recurved point disengages itself from the stop $t$ and strikes against the stop $t'$. In this position the shutter is found ready for work. In continuing to lift the button $b$ the point of the lever $b'$ is disengaged from the stop $t'$, the disk $j$ becomes free, turns in the direction of the arrow, Fig. 3, and in this movement uncovers during a longer or shorter time the objective $k$. The movement of the shutter is arrested by the stop $t''$ coming in contact with the recurved point of the lever $b'$.

To work the shutter again, the operator begins by pressing down the button $b$, which by means of the rod $h'$ will rock the lever $b'$. In this movement the point of the said lever disengages itself from the stop $t''$ and strikes against the stop $t'''$. Continuing to depress the button, the lever $b'$ is disengaged from the stop $t'''$, the disk $j$ becomes free and turns as above in the direction of the arrow. The same operation is repeated every time that the button $b$ is pressed down or raised.

The lever $b'$ and rod $h'$ are both connected to a lever $a'$ which is mounted rigidly at its middle point on a rock-shaft $u$. At the other end of the said rock-shaft another lever "$a'''$" is mounted similarly thereon, the two levers moving together. Their ends $m'$ away from the rod $b'$ have two vertical bars $v\,v$ attached to them, each of these bars being provided with two feet $v'\,v'$. These bars move up and down with the rocking of the said shaft and of course are operated by depressing the button $b$.

As will be seen by Figs. 3 and 8, the disk $j$ fixed on the shaft of drum $f$ is held stationary by the stops $t\,t'$ encountering the bent or recurved end of the lever $b'$. It is very easy to see that by the above simple construction, to allow the rotation of the disk, it suffices to disengage the bent point or end of the lever $b'$ from either pair of the stops. The disk thus freed then turns through one hundred and eighty degrees of rotation, that is to say until the other pair of stops diametrically opposite come in contact with the said point or end of the lever. By depressing or relieving of pressure the button $b$ connected to the lever $b'$ by the rod $h'$, I obtain the different movements above described, the drum $f$, spring drum or barrel $d$ and cord $e$, serving to turn the disk $j$, when the spring of the said drum $d$ has been put under tension as stated and the disk is released.

Behind the pieces $v\,v$ are arranged the plate carriers, the sensitized plates resting on supports $c'$ fixed to the two opposite sides of the case, Figs. 2 and 4. The two sides $x\,x$ of each plate-carrier are provided with two ears $x'\,x'$ corresponding to the two feet $v'\,v'$ of the two pieces $v\,v$. In pressing down or raising again the pieces $v\,v$ by means of levers $a'\,a''$ the feet $v'\,v'$ are disengaged from the ears $x'\,x'$. The plate-carrier, which is supported by the said feet is disengaged and rocks, being pressed by a spring $d'$ applied against a plate $e'$ placed behind the last plate-carrier of the series. In rocking, the disengaged plate-carrier falls into the bottom $v''$ of the apparatus which is lined with felt to receive it unhurt.

The feet $v'\,v'$ of the pieces $v\,v$ in their descending movement encounter immediately the ears $x'\,x'$ of the plate-carrier next following; which ears are placed lower than those of the preceding plate carrier which is about to fall. It is the same with the following plates, the ears of which are placed so that when the pieces $v\,v$ are lifted or lowered their feet $v'\,v'$ allow the plate-carrier to escape which they hold and at the same time encounter the plate-carrier following.

Each plate-carrier is provided in its lower part with two eyelets or grooves $z\,z$, through which pass rubber bands $y\,y$ for holding together the said plate-carriers, which, in rocking, open out like the leaves of a book. Between the last plate-carrier and a terminal plate $e''$ is placed a square piece or plate $f'''$ having characters on its face corresponding to the number of plate-carriers contained in the apparatus. This square piece advances every time that a plate-carrier rocks and falls into the bottom of the apparatus and the numerals inscribed thereon are presented behind an opening $g'$ provided in the top of the case, thus allowing the operator to ascertain easily at any time by inspection the number of sensitized plates or membranes remaining in the apparatus.

Having thus described my invention, what I claim as new, and desire to secure by Letters Patent, is—

1. In a camera shutter the button $b$ connecting rod $h'$ and lever $b'$ actuated thereby in combination with the disk $j$ having peripheral notches $q\,q'$ and two pairs of stops $t\,t'\,t''\,t'''$, a spring drum for turning the said disk, the pawl $s$ adapted to engage one or the other of the said notches according to the position of the disk, the said lever $b'$ being arranged to come in contact with one of each pair of stops as they are successively presented and afterward with the other stop of the same pair when operated by the button.

2. In a magazine camera the combination of the button $b$ rod $h'$ and devices operated thereby for successively dislodging the plate-holders with a plate $e''$ at the back of the series of plate-holders a spring bearing against the said plate from behind, a numbered slide fitting between the said plate and plate holders and moving forward therewith under an opening in the top of the camera box to indicate the number of plate holders remaining at any time in the camera substantially as set forth.

3. In a camera shutter the combination with the objective and the disk which turns in front of it, a spring drum for turning the said disk, a brake shoe $m$ arranged to bear against the said drum, an eccentric $o$ arranged to bear against the said shoe and having an arm $o'$ with a bent point and a fixed plate with a series of perforations or recesses therein arranged to receive the said point for regulating the pressure of said shoe on the spring drum and the speed of rotation of the disk substantially as set forth.

In testimony whereof I affix my signature in presence of two witnesses.

ALPHONSE ALEXANDRE FOIRET.

Witnesses:
CLYDE SHROPSHIRE,
E. G. LONTZ.